United States Patent
Miyake et al.

(10) Patent No.: US 10,259,740 B2
(45) Date of Patent: Apr. 16, 2019

(54) MULTI-LAYER GLASS AND METHOD FOR PRODUCING THE SAME

(71) Applicant: HITACHI CHEMICAL COMPANY, LTD., Tokyo (JP)

(72) Inventors: Tatsuya Miyake, Tokyo (JP); Takashi Naito, Tokyo (JP); Takuya Aoyagi, Tokyo (JP); Eiichi Ogiwara, Tokyo (JP); Akihito Iwai, Tokyo (JP); Shinichi Tachizono, Tokyo (JP); Kei Yoshimura, Tokyo (JP); Yuji Hashiba, Tokyo (JP)

(73) Assignee: HITACHI CHEMICAL COMPANY, LTD., Tokyo (JP)

(*) Notice: Subject to any disclaimer, the term of this patent is extended or adjusted under 35 U.S.C. 154(b) by 73 days.

(21) Appl. No.: 15/408,090

(22) Filed: Jan. 17, 2017

(65) Prior Publication Data

US 2017/0203997 A1  Jul. 20, 2017

(30) Foreign Application Priority Data

Jan. 18, 2016 (JP) .................................. 2016-006755

(51) Int. Cl.
*E06B 3/66* (2006.01)
*C03C 3/21* (2006.01)
(Continued)

(52) U.S. Cl.
CPC .............. *C03C 3/21* (2013.01); *B23K 35/262* (2013.01); *C03C 3/122* (2013.01); *C03C 27/06* (2013.01);
(Continued)

(58) Field of Classification Search
CPC .............. E06B 3/66304; E06B 3/67334; E06B 3/6612; E06B 3/6775; Y02B 80/22; Y02B 80/24
See application file for complete search history.

(56) References Cited

U.S. PATENT DOCUMENTS 3,350,181 A * 10/1967 Miyoshi .............. E06B 3/66309
428/598
6,533,630 B1  3/2003 Tarajima et al.
(Continued)

FOREIGN PATENT DOCUMENTS

| JP | 2000-156160 A | 6/2000 |
| JP | 2002-080247 A | 3/2002 |
| JP | 2015-147728 A | 8/2015 |

OTHER PUBLICATIONS

Machine translation of applicant cited JP 2002-080247, (Year: 2002).*

*Primary Examiner* — Donald J Loney
(74) *Attorney, Agent, or Firm* — Volpe and Koenig, P.C.

(57) ABSTRACT

An object of the present invention is to provide a multi-layer glass with high degree of vacuum and high mass productivity. In order to achieve the object, the multi-layer glass according to the present invention includes a first glass substrate, a second glass substrate disposed facing the first glass substrate with a space therebetween, a sealing portion, which contains a glass composition and is disposed in a peripheral edge portion of the space between the first glass substrate and the second glass substrate, and column members disposed between the first glass substrate and the second glass substrate, wherein the column member is made of a metal or alloy, and a melting point of the metal or alloy is higher than a softening point of the glass composition and is lower than or equal to a temperature 20° C. higher than a flow point of the glass composition.

14 Claims, 9 Drawing Sheets (51) Int. Cl.
    *B23K 35/26*    (2006.01)
    *C03C 3/12*     (2006.01)
    *C22C 13/00*    (2006.01)
    *E06B 3/663*    (2006.01)
    *E06B 3/673*    (2006.01)
    *E06B 3/677*    (2006.01)
    *C03C 27/06*    (2006.01)
    *C03C 27/08*    (2006.01)
(52) U.S. Cl.
    CPC .............. *C03C 27/08* (2013.01); *C22C 13/00* (2013.01); *E06B 3/6612* (2013.01); *E06B 3/66304* (2013.01); *E06B 3/6775* (2013.01); *E06B 3/67334* (2013.01); *Y02A 30/25* (2018.01); *Y02B 80/22* (2013.01); *Y02B 80/24* (2013.01)

(56) References Cited

U.S. PATENT DOCUMENTS

| | | | |
|---|---|---|---|
| 2012/0213954 A1* | 8/2012 | Dennis | C03C 8/04 428/34 |
| 2015/0068665 A1 | 3/2015 | Abe et al. | |

\* cited by examiner

MULTI-LAYER GLASS AND METHOD FOR PRODUCING THE SAME

CROSS REFERENCE TO RELATED APPLICATIONS

This application claims the foreign priority benefit under Title 35, United States Code, § 119 (a)-(d) of Japanese Patent Application No. 2016-006755, filed on Jan. 18, 2016, the disclosure of which is herein incorporated by reference in its entirety.

TECHNICAL FIELD

The present invention relates to a multi-layer glass and a method for producing the same.

BACKGROUND ART

The multi-layer glass is applied to, for example, a window glass for building materials which requires high thermal insulation performance, a door of an industrial refrigerator or freezer, and an opening portion of window material for a transport equipment such as an automobile which requires energy saving. In recent years, along with demand for the window glass having excellent thermal insulation performance, the multi-layer glass having thermal insulation performance has been frequently used and rapidly spread.

As the multi-layer glass, there is a multi-layer glass panel in which a space formed by opposing plate glasses is filled with air or rare gas such as argon, or a vacuum insulation multi-layer glass panel in which the space is vacuum evacuated.

In the vacuum insulation multi-layer glass, in order to hermetically seal the space (hereinafter, referred to as a gap) formed by the opposing plate glasses, low melting point glass having a low gas permeability is used in a vacuum sealing portion. During vacuum sealing, spacers are arranged at equal intervals in the gap and a distance between the glass panels is maintained at a thickness of about 0.2 mm so that the glass panel is not broken by collapse of the gap due to a pressure difference from atmospheric pressure. Further, in order to improve the thermal insulation performance, there is also a multi-layer glass provided with two thermal insulation layers of a vacuum layer and a rare gas-filled layer. However, the rare gas-filled layer requires a thickness of about 10 mm of the thermal insulation layer, and a thickness of the entire multi-layer glass is about 20 mm.

The vacuum insulation multi-layer glass is generally produced by vacuum evacuating the gap in the panel by using an evacuation pipe.

In Patent Document 1, at least one hole through the plate glass is provided, the evacuation pipe made of glass or metal is connected to the through-hole, the evacuation pipe is connected to a vacuum pump or the like, and the gap is vacuum evacuated. After evacuation, an evacuation opening portion is sealed with a cap or the like made of glass or metal.

Patent Document 2 discloses a technology for producing a plasma display panel by evacuating and sealing the gap in the glass panel in a vacuum environment without using the evacuation pipe. By this consistent vacuum production without exposure to the atmosphere, the vacuum sealing can be carried out without degrading properties of members in the plasma display panel.

Patent Document 3 discloses production of the multi-layer glass by sealing the evacuation pipe during evacuation through the evacuation pipe by using a partition wall provided with a slit, and then by cutting out a portion which does not include the evacuation pipe.

CITATION LIST

Patent Literature

[Patent Document 1]
Japanese Patent Application Publication No. 2002-080247
[Patent Document 2]
Japanese Patent Application Publication No. 2000-156160
[Patent Document 3]
Japanese Patent Application Publication No. 2015-147728

SUMMARY OF INVENTION

Technical Problem

In a method disclosed by Patent Document 1, it is necessary to form an evacuation hole in the plate glass. From the viewpoint of design, the multi-layer glass with an invisible hole for evacuation or the multi-layer glass without the evacuation hole is desired.

Further, a process for sealing the evacuation hole is required. In order to supply the multi-layer glass as a housing material, high productivity is important and simplification of production process is required. Further, development of a production method, which can form a plurality of thermal insulation layers in order to improve the thermal insulation performance, has been desired.

A method disclosed by Patent Document 2 has an advantage that the evacuation pipe is not required, but there is a possibility that degree of vacuum decreases by gas generation from sealing materials during the sealing.

In a method disclosed by Patent Document 3, since the gap formed by a frit seal and two plate glasses is evacuated through the evacuation pipe, conductance is small and there is a problem from the viewpoint of the degree of vacuum. Further, the panel structure is complicated when forming a plurality of vacuum insulation layers.

Therefore, an object of the present invention is to provide a multi-layer glass with high degree of vacuum and high mass productivity.

Solution to Problem

A multi-layer glass according to the present invention includes a first glass substrate, a second glass substrate disposed facing the first glass substrate with a space therebetween, a sealing portion, which contains a glass composition and is disposed in a peripheral edge portion of the space between the first glass substrate and the second glass substrate, and column members disposed between the first glass substrate and the second glass substrate, wherein the column member is made of a metal or alloy, and wherein a melting point of the metal or alloy is higher than a softening point of the glass composition and is lower than or equal to a temperature 20° C. higher than a flow point of the glass composition.

Advantageous Effects of Invention

According to the present invention, it is possible to provide a multi-layer glass with high degree of vacuum and high mass productivity.

DESCRIPTION OF EMBODIMENTS

Hereinafter, embodiments of the present invention will be described in detail with reference to the drawings. However, the present invention is not limited to the embodiments described herein, and can be appropriately combined or modified without departing from the scope of the present invention.

Figure 1:
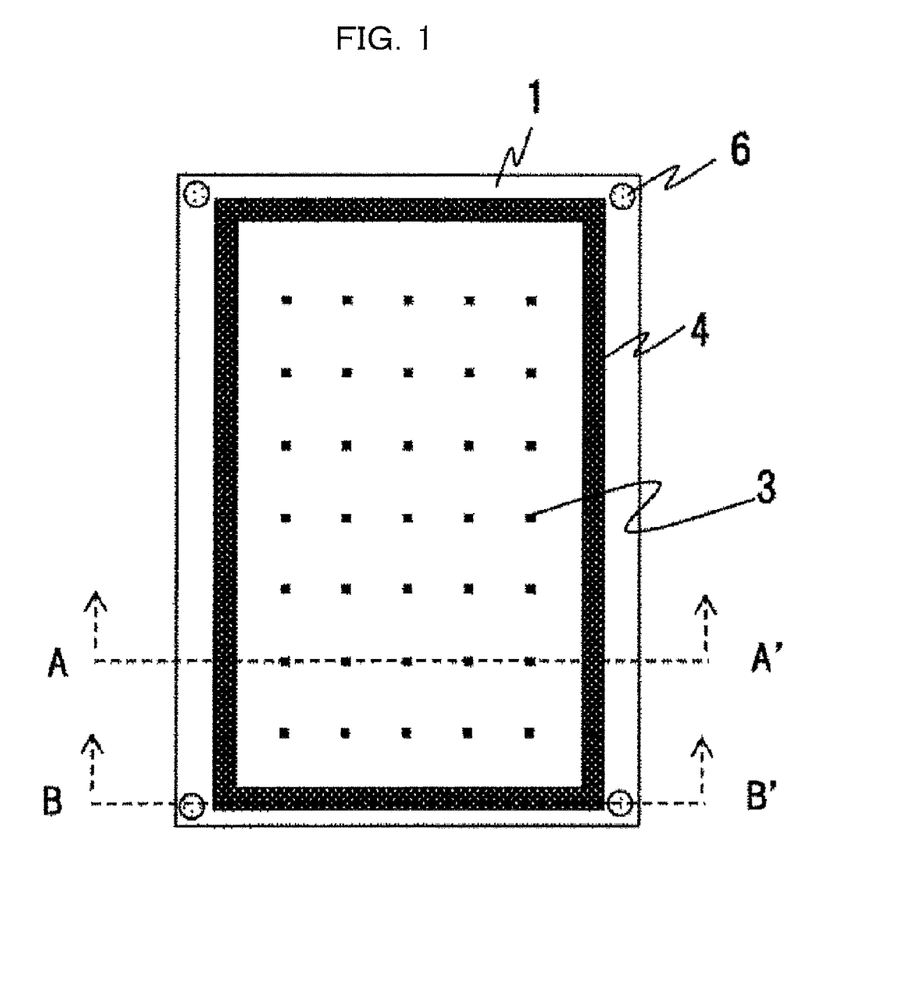
FIG. 1 is a top view of a multi-layer glass according to an embodiment of the present invention.
Figure 2A:
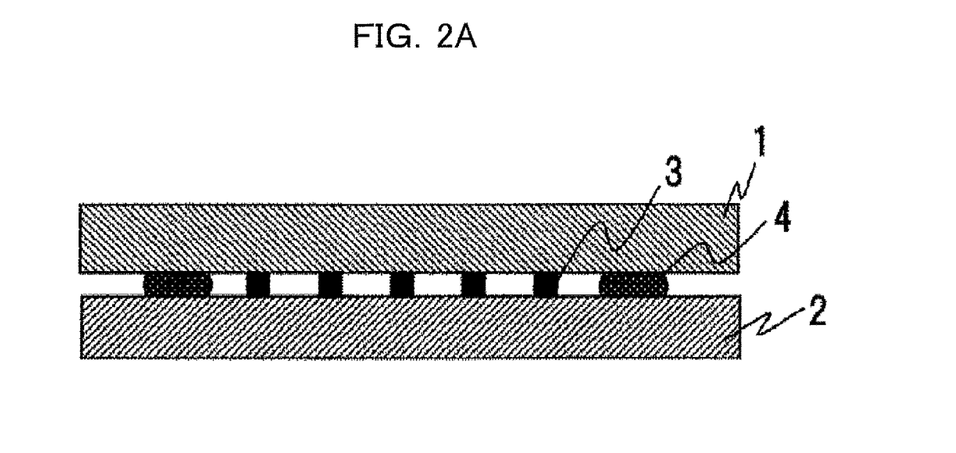
FIG. 2A is a cross-sectional view taken along a line A-A' of the multi-layer glass according to FIG. 1.
Figure 2B:
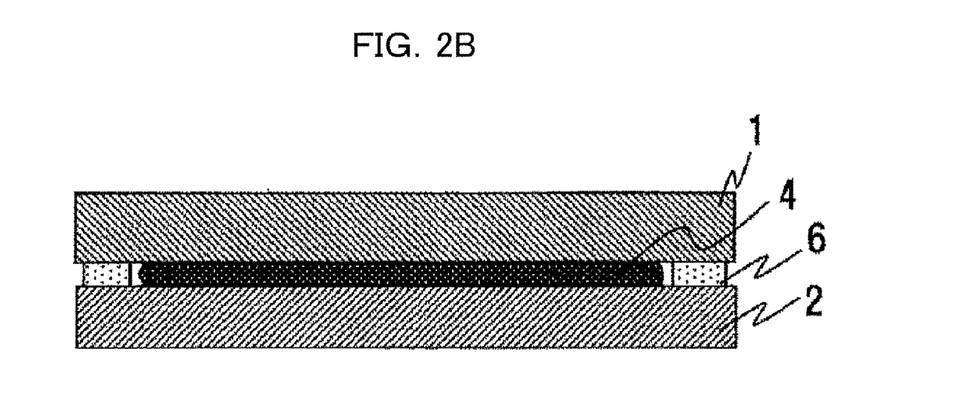
FIG. 2B is a cross-sectional view taken along a line B-B' of the multi-layer glass according to FIG. 1.

FIG. 1 is a top view of a multi-layer glass according to an embodiment of the present invention. FIG. 2A is a cross-sectional view taken along a line A-A' of the multi-layer glass according to FIG. 1, and FIG. 2B is a cross-sectional view taken along a line B-B' of the multi-layer glass according to FIG. 1. The multi-layer glass includes a first glass substrate 1, a second glass substrate 2 disposed facing the first glass substrate 1 with a space therebetween, a spacer 3 for ensuring the space between the two glass substrates, a sealing portion 4 for sealing the two glass substrates, and column members 6 disposed between the two glass substrates. The sealing portion 4 is formed of glass paste containing a glass composition. An internal space between the two glass substrates is formed by the sealing portion 4.

<Glass Substrate>

As the first glass substrate and the second glass substrate, it is possible to use a plate glass which is generally used for the multi-layer glass. As the plate glass, it is possible to use, for example, float plate glass, figured glass, frosted glass, tempered glass, wire net plate glass and wire line plate glass. Further, it is also possible to use plate glass which is laminated with a heat ray reflection film on a surface thereof.

<Spacer>

The spacer is used for maintaining the space between the two glass substrates. As the spacer, it is possible to use, for example, a spherical spacer, a linear spacer or a mesh spacer. The spacer is not particularly limited as long as it is a material which has a lower hardness than that of the plate glass of the multi-layer glass and has an appropriate compressive strength. It is possible to use, for example, glass, metal, alloy, steel, ceramics or plastics.

A size of the spacer can be selected to meet a thickness of the space between the two glass substrates. For example, when a distance between the two glass substrates should be 200 μm, a spacer having a diameter of about 200 μm can be used. A distance between the spacers when arranging the spherical, linear or mesh spacers is 200 mm or less, and is preferably 10 mm to 100 mm. Arrangement of the spacers may be regular or irregular as long as the distance between the spaces is within a distance range described above.

Further, in order to obtain the space of a suitable thickness in a vacuum state, it is effective to introduce spherical beads or the like having a uniform particle size in the spacer 3 or the sealing portion 4.

<Sealing Portion>

The sealing portion 4 is formed of a sealing material containing a solvent and glass composition. As the sealing material, it is necessary to select a material capable of sealing the glass substrates at or below a heat resistance temperature of the glass substrate. Further, since the glass substrate is easily broken by rapid heating or rapid cooling, it is necessary to gradually heat or cool the glass substrate during the sealing, and the sealing at a temperature as low as possible is required in order to improve productivity of a vacuum insulation multi-layer glass panel. Therefore, the glass composition is preferably a low melting point glass. Here, the low melting point glass refers to a glass composition having a melting point of 600° C. or less. By using the low melting point glass, it is possible to seal the glass substrates at a low temperature.

In addition, it is preferable not to contain lead intentionally from the viewpoint of environmental impact. In this specification, a lead-free glass composition means a glass composition not containing lead intentionally, and includes a glass composition containing lead of 1000 ppm or less which is mixed therein unintentionally.

The low melting point glass composition preferably contains at least vanadium oxide, tellurium oxide and silver oxide as main components.

In general, as characteristic temperatures, such as glass transition point, yield point and softening point, of a glass is low, softening fluidity at low temperature is good, whereas when the characteristic temperatures are too low, crystallization tendency is increased, the glass is easily crystallized during heating and burning, and the softening fluidity at low temperature is deteriorated. Further, as the characteristic temperatures of the glass are low, the chemical stability such as water resistance and acid resistance is poor. Further, the environmental impact tends to increase. For example, in a conventional PbO—$B_2O_3$-based low melting point glass composition, as harmful PbO content increases, the characteristic temperatures can be reduced, however, the crystallization tendency is increased and the chemical stability is reduced, and further the environmental impact also increases.

However, by containing vanadium oxide, tellurium oxide and silver oxide, reduction of the characteristic temperatures and suppression of the crystallization can be both achieved. Silver oxide is contained in order to improve the chemical stability and reduce the characteristic temperatures such as glass transition point, yield point and softening point. Vanadium oxide is contained in order that metallic silver does not precipitate due to reduction of silver oxide during production of the glass. When silver oxide contained as a glass component does not exist in a state of silver ion in the glass, desired effect of reduction of the characteristic temperatures is not obtained. When silver oxide content is increased, that is, when silver ion content in the glass is increased, reduction of the characteristic temperatures can be achieved, however, in this case, it is also necessary to increase vanadium oxide content in order to prevent or suppress precipitation of metallic silver. During production of the glass, up to two monovalent silver ions can be contained in the glass with respect to a pentavalent vanadium ion. Tellurium oxide is a glass-forming component for forming the glass during production of the glass. Therefore, when tellurium oxide is not contained, it is not possible to form the glass. However, up to one tetravalent tellurium ion is effective with respect to one pentavalent vanadium ion, and when the number of tetravalent tellurium ions exceeds one, there is a possibility that a compound of tellurium and silver is precipitated.

In view of functions of vanadium oxide, tellurium oxide and silver oxide described above, it is desirable that in a lead-free low melting point glass composition, a total of $V_2O_5$, $TeO_2$ and $Ag_2O$ is at least 85 mol %, and $TeO_2$ content and $Ag_2O$ content are respectively 1-2 times $V_2O_5$ content. When the lead-free low melting point glass composition has a composition more or less than these composition ranges, there is a possibility of causing problems such that metallic silver is precipitated during production of the glass, effect of reduction of the characteristic temperatures is reduced, the glass is significantly crystallized during heating and baking, or the chemical stability is reduced.

Further, it is preferred that the glass composition contains at least one of yttrium oxide and lanthanoid oxide as an additional component and a content of the additional component is 0.1-0.3 mol %. Because, by containing a small amount of at least one of yttrium oxide and lanthanoid oxide, it is possible to reduce the crystallization tendency. When yttrium oxide content and lanthanoid oxide content are less than 0.1 mol %, there is almost no effect of reducing the crystallization tendency. Meanwhile, when they are more than 3.0 mol %, the characteristic temperatures such as softening point may rise, or the crystallization tendency may be increased. As a component more effective for reducing the crystallization tendency among yttrium oxide and lanthanoid oxide, there are $Y_2O_3$, $La_2O_3$, $CeO_2$, $Er_2O_3$ and $Yb_2O_3$ in form of oxides, and it is effective to contain 0.1-2.0 mol % of any one or more of the oxides. In particular, it is effective to contain $Y_2O_3$ and $La_2O_3$ among them, and effective content is 0.1-1.0 mol %.

Further, in order to make it easy to obtain the lead-free low melting point glass composition in a uniform glassy state (an amorphous state), and in order not to enhance the crystallization tendency of the glass obtained, it is effective to contain 13 mol % or less of any one or more of $BaO$, $WO_3$ and $P_2O_5$, in terms of oxides.

From the above, for the lead-free low melting point glass composition, it is possible to set a second endothermic peak temperature (softening point) by differential thermal analysis (DTA) to 280° C. or less. Further, it is possible to set a crystallization initiation temperature by DTA higher than the second endothermic peak temperature (softening point) by at least 60° C. As a result, it is possible to provide the sealing material which has a high crystallization temperature and a good softening fluidity at low temperature.

Note that, the sealing material used in the sealing portion 4 may contain low thermal expansion ceramic particles in addition to the glass composition. The low thermal expansion ceramic particles should be contained in order to match thermal expansion coefficients of the first glass substrate and the second glass substrate.

<Column Member>

The column member is made of a metal or alloy, and serves as a vacuum spacer. As a metal or alloy constituting the column member, one having a melting point, that is higher than the softening point of the glass composition forming the sealing portion and is lower than or equal to a temperature 20° C. higher than a flow point of the glass composition, is used. The melting point of the metal or alloy constituting the column member is preferably higher than the softening point of the glass composition and is preferably lower than or equal to the flow point of the glass composition.

Figure 3:
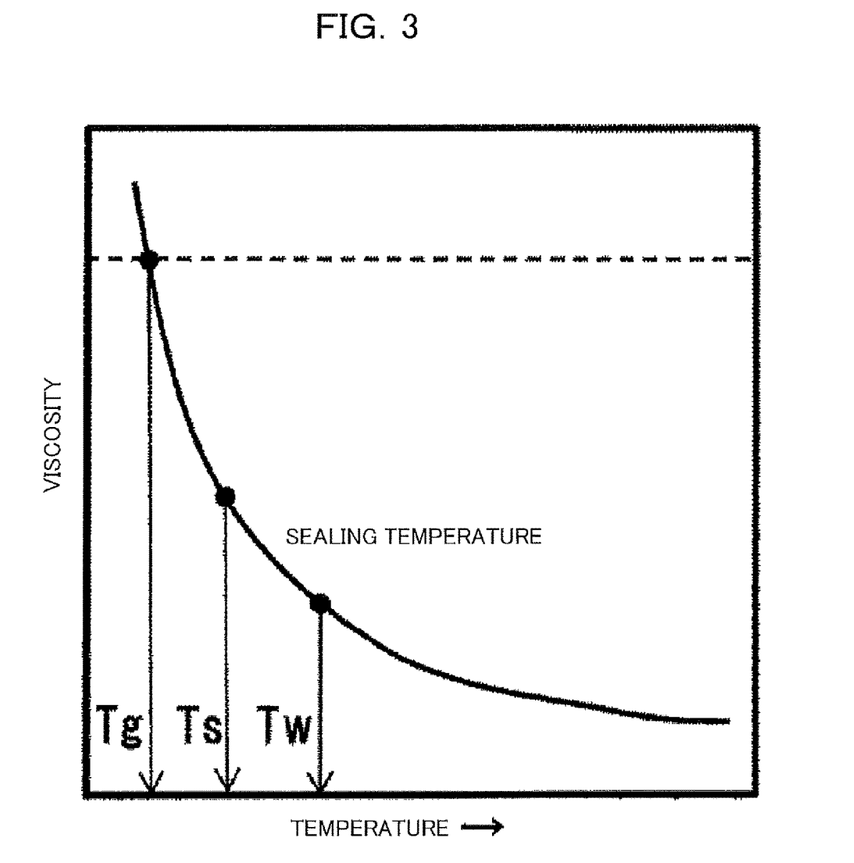
FIG. 3 is a graph showing a relationship between viscosity and temperature of the glass.
Figure 4:
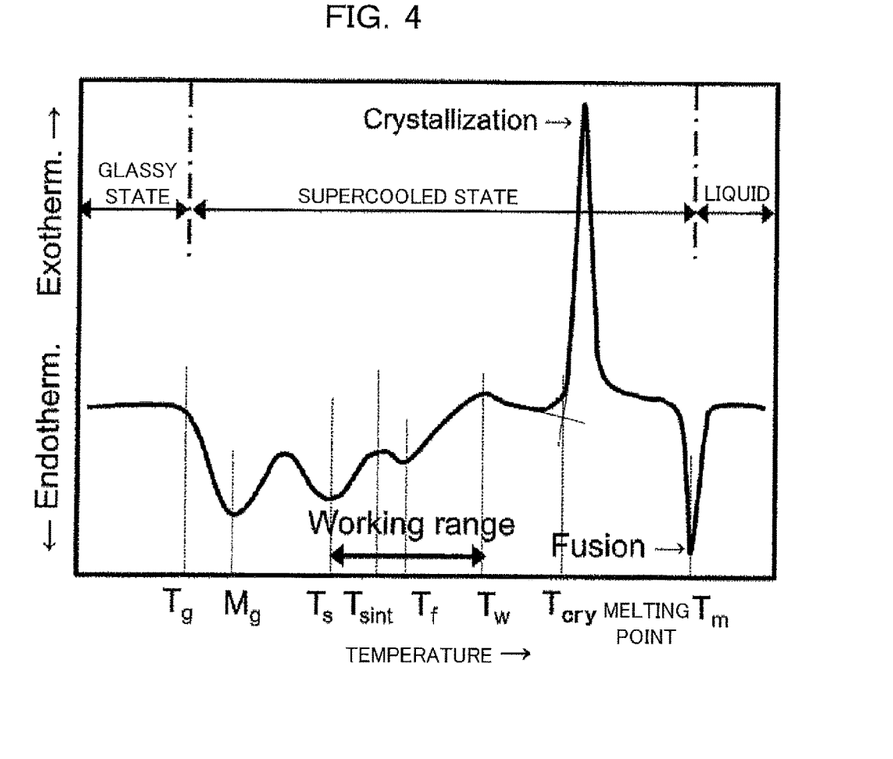
FIG. 4 is a DTA curve of the glass.

Here, the characteristic temperatures in the present invention will be described. FIG. 3 is a graph showing a relationship between viscosity and temperature of the glass, and FIG. 4 is a graph of differential thermal analysis (DTA) of the glass composition. In general, DTA of the glass is measured at a heating rate of 5° C./min in the atmosphere, by using glass particles having a particle size of about several tens μm and further by using high purity alumina (α-$Al_2O_3$) particles as a standard sample. As shown in FIG. 4, a transition point $T_g$ refers to a starting point of a first endothermic peak temperature or a temperature at which the glass is transferred to a supercooled liquid, a yield point $M_g$ refers to the first endothermic peak or a temperature at which expansion of the glass stops, a softening point $T_s$ refers to a second endothermic peak temperature or a temperature at which softening starts, a sintering point $T_{sint}$ refers to a temperature at which the glass becomes a sintered body, a flow point $T_f$ refers to a temperature at which the glass begins to melt, a working point $T_w$ refers to a temperature suitable for forming the glass, and a crystallization onset temperature $T_{cry}$ refers to an onset temperature of exothermic peak due to crystallization. Note that, each characteristic temperature is obtained by tangent method.

Further, the characteristic temperatures such as $T_g$, $M_g$ and $T_s$ are defined by the viscosity of the glass, and $T_g$, $M_g$, $T_s$, $T_{sint}$, $T_f$ and $T_w$ are temperatures respectively correspond to $10^{13.3}$ poise, $10^{11.0}$ poise, $10^{7.65}$ poise, $10^6$ poise, $10^5$ poise and $10^4$ poise. The crystallization tendency is determined by $T_{cry}$ and a size of exothermal peak due to crystallization, that is, a crystallization calorific value, and a high $T_{cry}$, that is, an increase in temperature difference between $T_s$ and $T_{cry}$, and reduction of the crystallization calorific value mean that the glass is difficult to crystallize.

Figure 5:
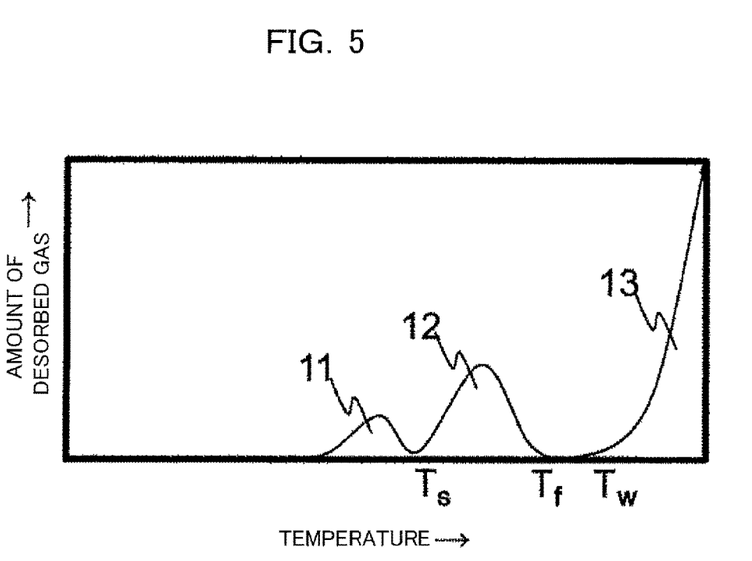
FIG. 5 is a graph showing a relationship between an amount of desorbed gas and panel temperature.

In a sealing step during producing the multi-layer glass, the glass panel is heated at a temperature between the working point and the softening point of the glass composition used as the sealing material. FIG. 5 shows a relationship between an amount of desorbed gas and temperature in the sealing step. When the glass panel is heated, desorbed gas components 11 are detected up to the softening point $T_s$ of the glass composition used as the sealing material. The desorbed gas components 11 are mainly water and the like which are physically adsorbed on a surface of the glass panel. When the glass panel is further heated, desorbed gas components 12, which are chemically adsorbed on the surface of the glass panel, are desorbed. The desorbed gas components 12 are reduced near the flow point $T_f$ of the glass composition. When the glass panel is further heated to a temperature exceeding the working point $T_w$, the low melting point glass composition is reduced, and desorbed gas components 13 mainly containing oxygen are generated by reduction of the glass. From FIG. 5, it is possible to seal the glass substrates in a high vacuum state by setting the sealing temperature to near the flow point $T_f$ at which an amount of desorbed gas is small.

Here, by using the metal or alloy having a melting point, that is higher than the softening point of the glass composition and is lower than or equal to a temperature 20° C. higher than the flow point of the glass composition, the glass substrates are not sealed with each other by virtue of the column members even when the glass composition used as the sealing material starts to soften at a temperature lower than the melting point of the metal or alloy constituting the column member, and thus it is possible to evacuate the gas generated. After that, by heating the glass panel to near the flow point of the glass composition, the column members and the glass composition flow, so that the two glass substrates can be sealed.

As described above, by using the metal or alloy having a melting point, that is higher than the softening point of the glass composition and is lower than or equal to a temperature 20° C. higher than the flow point of the glass composition, it is possible to vacuum evacuate a space between the two glass substrates until just before the sealing. As a result, it is possible to provide the multi-layer glass with high degree of vacuum.

When using the glass composition containing $V_2O_5$, $TeO_2$ and $Ag_2O$ as the sealing material, the melting point of the metal or alloy constituting the column member is preferably lower than or equal to 320° C. As the metal or alloy constituting the column member, for example, Bi, Sn, gold-tin alloy, zinc-tin alloy and Sn-3.5% Ag eutectic solder can be used.

In FIGS. 1, 2, the column members are arranged outside the sealing portion, however, they may be arranged inside the sealing portion, and an arrangement of the column members is not particularly limited.

<Method for Producing Multi-Layer Glass>

Figure 6A:
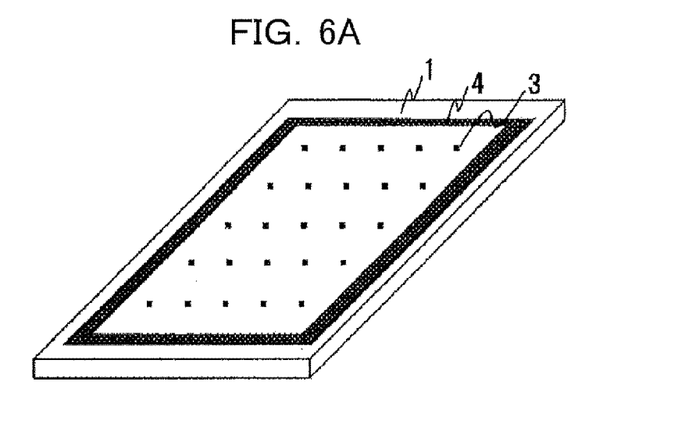
FIGS. 6A, 6B, 6C are views showing a production process of the multi-layer glass according to an embodiment of the present invention.
Figure 6B:
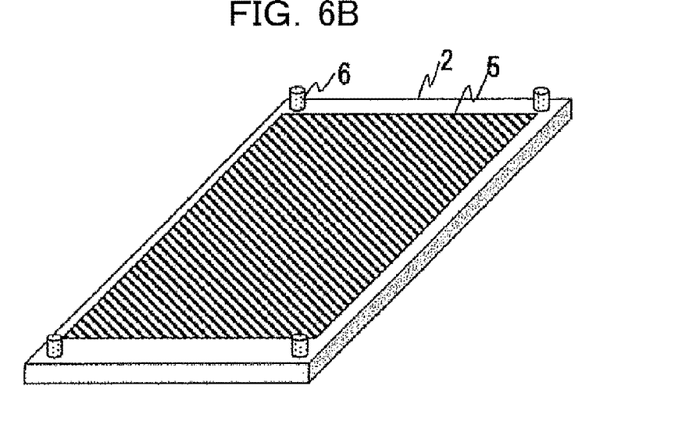
Figure 6C:
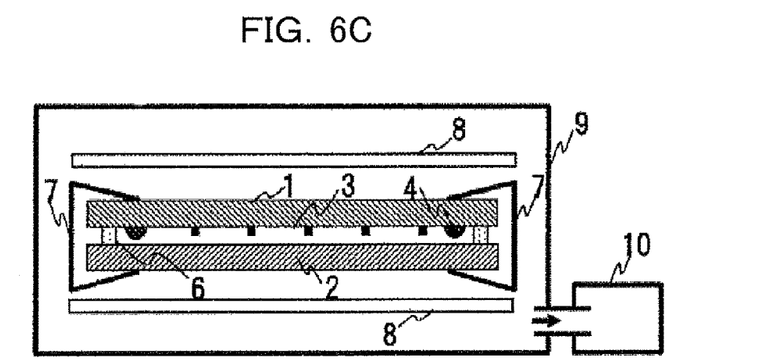

A method for producing the multi-layer glass according to the present invention will be described with reference to FIGS. 6A, 6B, 6C. The method for producing the multi-layer glass according to the present invention includes (a) a step of applying a sealing material containing a glass composition to a first glass substrate 1 and then calcining the first glass substrate to form a sealing portion 4, (b) a step of arranging column members 6, which are higher than the sealing portion, on a second glass substrate 2, (c) a step of superimposing the first glass substrate and the second glass substrate and then pressurizing and fixing the glass substrates, and (d) a vacuum sealing step of evacuating the first glass substrate and the second glass substrate, which are fixed in a vacuum device 9, while heating them to a temperature, that is higher than the softening point of the glass composition and is lower than or equal to a temperature 20° C. higher than the flow point of the glass composition. Note that, in this specification, a temperature near the softening point is a temperature of the softening point±10° C., and a temperature near the flow point is a temperature of the flow point±10° C.

When the heat ray reflection film is laminated on the surface of the glass substrate, it is preferable to laminate the heat ray reflection film on the second glass substrate in the step (b).

The glass substrates are pressurized and fixed, for example, by using a plurality of clips 7. The clip 7 is preferably made of stainless steel material or inconel material in view of heat resistance of a spring. The glass panel is vertically sandwiched and heated by heaters 8. Heat is transferred by radiation or by direct contact with the heaters 8. The heaters 8 and the glass panel are arranged in the vacuum device 9, and are vacuum evacuated by a vacuum pump 10.

It is preferred that a temperature in a vacuum evacuation step is increased to a first temperature and is maintained at the first temperature, and then the temperature is increased to a second temperature and is maintained at the second temperature. It is preferred that the first temperature is higher than or equal to the softening point of the glass composition and is lower than the melting point of the metal or alloy constituting the column member, and the second temperature is higher than or equal to the melting point of the metal or alloy constituting the column member and is lower than or equal to a temperature 10° C. higher than the flow point of the glass composition.

Figure 7:
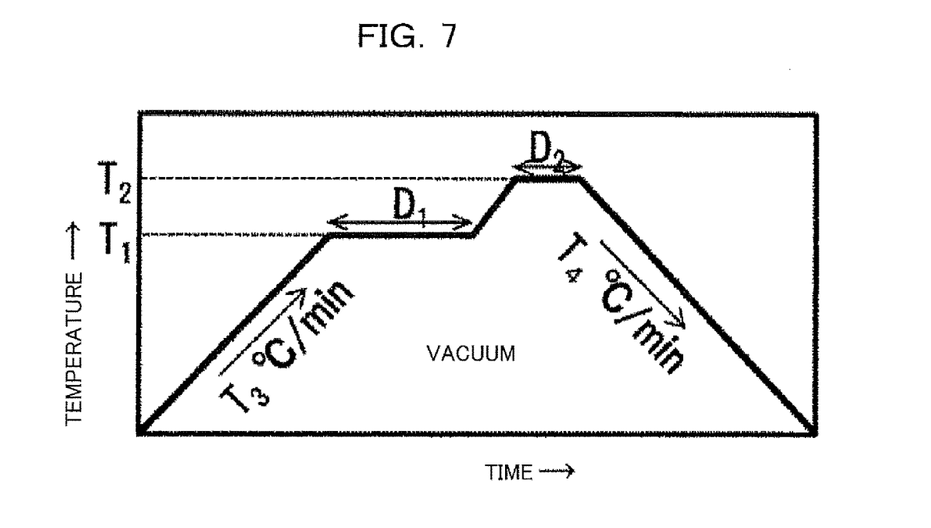
FIG. 7 is a graph showing a temperature profile of sealing step.

A specific example of the temperature in the vacuum evacuation step will be described with reference to FIG. 7. FIG. 7 is a temperature profile of the vacuum evacuation step. The temperature is increased to a temperature $T_1$ [° C.] at a heating rate $T_3$ [° C./min]. $T_3$ is set to 1-10 [° C./min]. The temperature is maintained at the temperature $T_1$ [° C.] for 30-60 min, and then increased to a temperature $T_2$ [° C.] at the heating rate $T_3$ [° C./min]. The temperature is maintained at the temperature $T_2$ [° C.] for 10-30 min, and then reduced. A cooling rate $T_4$ [° C./min] is in a range of 1-20 [° C./min]. Here, it is preferred that the temperature $T_1$ [° C.] is a temperature 5-20° C. higher than the softening point $T_s$ of the lead-free low melting point glass composition, and the temperature $T_2$ [° C.] is near the melting point of the metal or alloy constituting the column member 6. By setting the temperature profile described above, the column members 6 and a seal frit of the sealing portion 4 made of the glass composition are simultaneously collapsed, and thus it is possible to obtain a good sealing state.

With the method for producing the multi-layer glass according to the present invention described above, since there is no need to provide an evacuation hole in the glass substrate, it is possible to omit steps of forming a hole in the glass substrate and closing the hole after vacuum evacuation, thereby simplifying a production process of the multi-layer glass.

Further, since there is no need to evacuate the glass substrates by using an evacuation pipe, throughput is increased by stacking the multi-layer glasses in multiple stages in a vacuum chamber to be heated.

Figure 8:
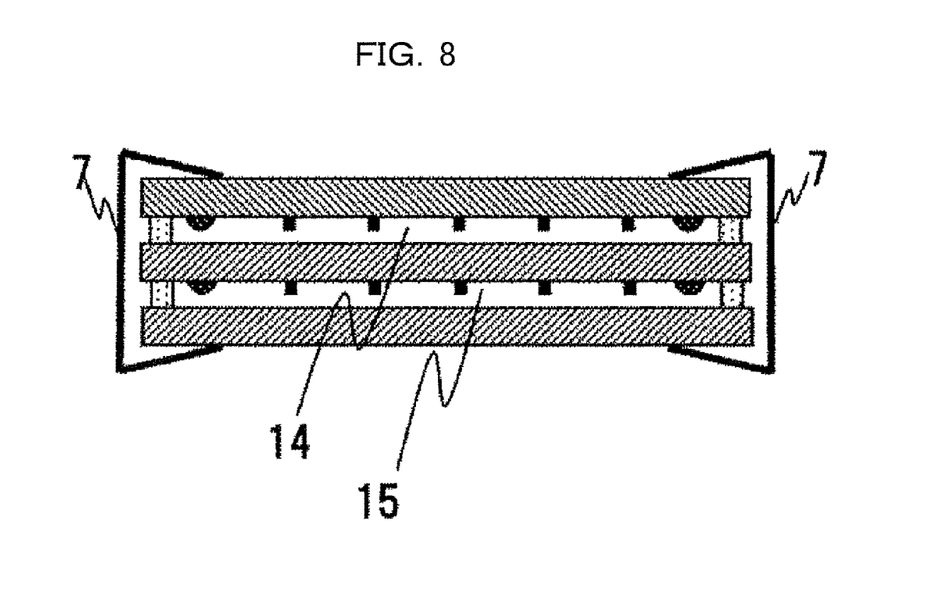
FIG. 8 is a configuration diagram of two thermal insulation layers of a vacuum insulation multi-layer glass.

Further, with the method for producing the multi-layer glass according to the present invention, it is possible to easily form a plurality of vacuum layers. In order to further improve thermal insulation properties, it is effective to form a plurality of thermal insulation layers. In a method of using the evacuation pipe in Patent Document 1 or the like, in order to form the plurality of thermal insulation layers, it is necessary to use production equipment with a complicated evacuation structure. As in the method for producing the multi-layer glass according to the present invention, in a method of ensuring a vacuum evacuation path by using the column member 6 as the vacuum spacer, it is possible to form the multiple thermal insulation layers by forming multiple layers of the glass substrate, the sealing portion and the like. FIG. 8 shows a production process when forming two layers of vacuum layers 14, 15. It is possible to form the plurality of thermal insulation layers simply by changing a size of the clip 7. Further, it is possible to form three or four thermal insulation layers. It should be noted that when the number of the thermal insulation layers increases, a thickness of the multi-layer glass increases, and when n thermal insulation layers are formed, an entire weight of the multi-layer glass increases by (n+1)/2 times.

Figure 9:
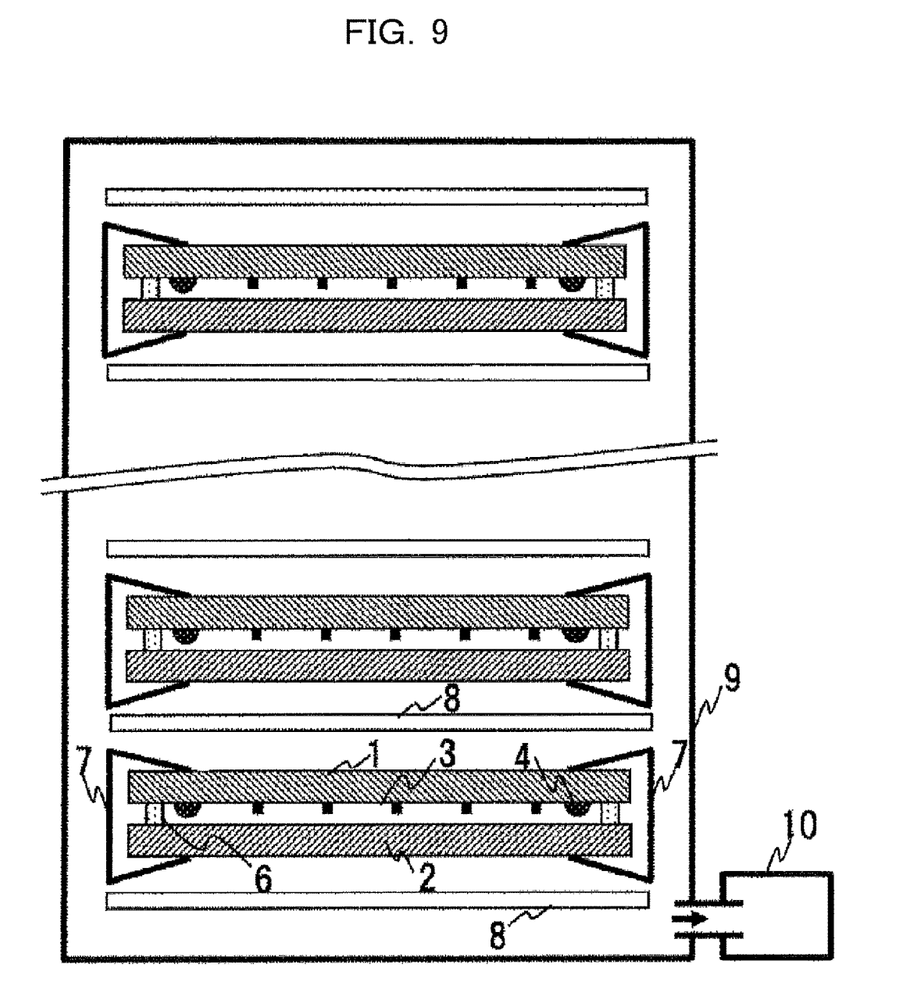
FIG. 9 is a configuration diagram of a batch-type panel sealing device.

Further, in the vacuum sealing step, a batch-type panel sealing device having a multi-stage panel installation equipment may be used. In order to supply the vacuum insulation multi-layer glass as a building window material, it is necessary to shorten a tact time as much as possible and mass-produce the multi-layer glass. FIG. 9 shows the batch-type panel sealing device having the multi-stage panel installation equipment. It is possible to place the glass panels in multiple stages and simultaneously perform the sealing step. By stacking the multi-layer glasses in multiple stages, mass productivity is improved. Since thermal conductivity in vacuum is poor, by arranging the heaters 8 so as to be interposed between the glass panels, it is possible to equalize temperature distribution in the vacuum device, thereby improving yield.

Figure 10:
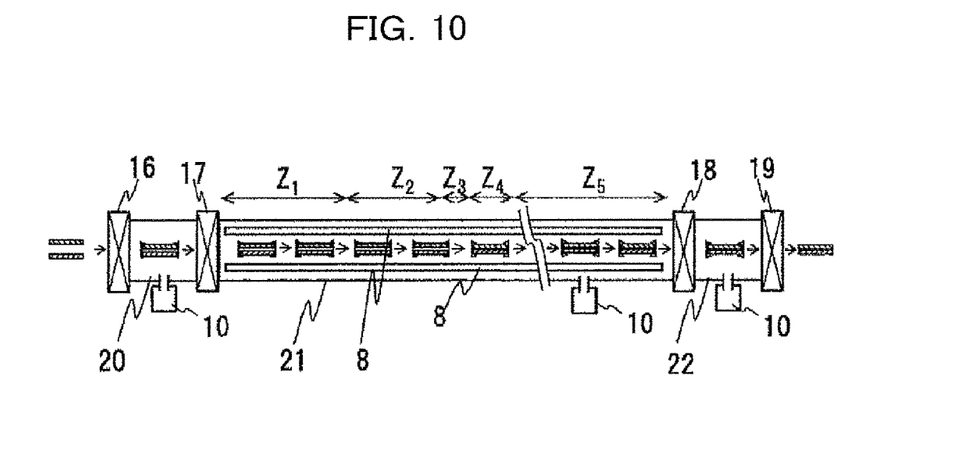
FIG. 10 is a configuration diagram of a sheet-type panel sealing device.
Figure 11:
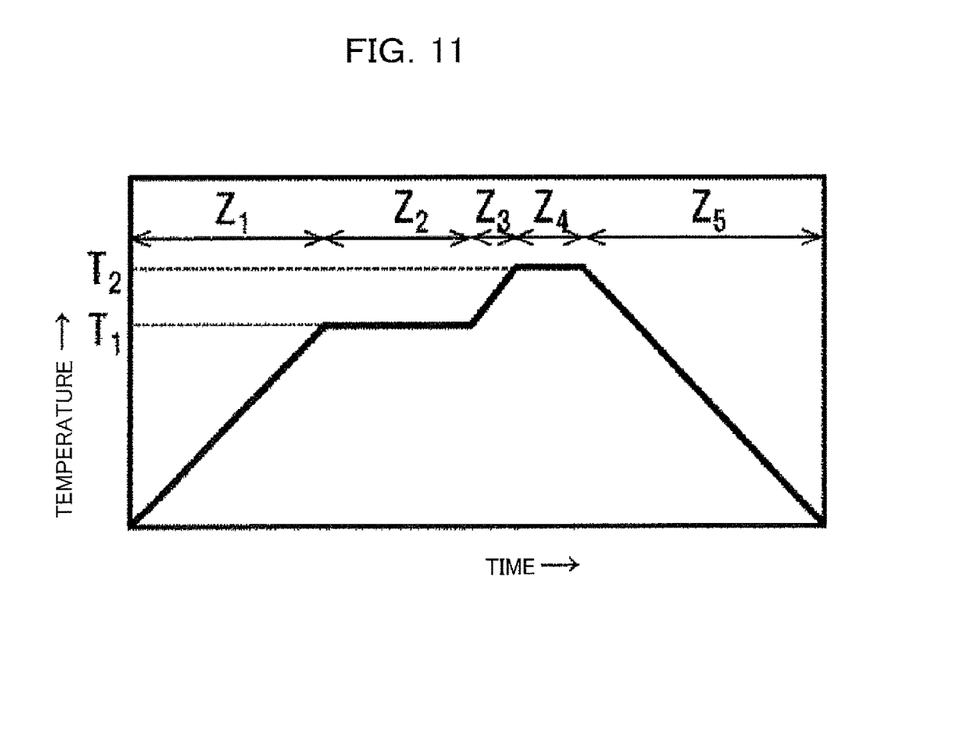
FIG. 11 is a graph showing a temperature profile when using the sheet-type panel sealing device.

A sheet-type panel sealing device including a panel carry-in chamber, a tunnel vacuum calcination furnace and a panel carry-out chamber may be used to produce the multi-layer glass. FIG. 10 shows the sheet-type panel sealing device, and FIG. 11 shows a temperature profile when using the sheet-type panel sealing device. The sheet-type panel sealing device is configured such that the vacuum sealing step is performed during flowing in a tunnel vacuum calcination furnace 21. First, a pair of the glass substrates is set and is introduced into a panel evacuation preparation chamber 20 by opening a gate valve 16. Then, the gate valve 16 is closed, and a panel carry-in chamber 20 is evacuated to a vacuum. After evacuation, a gate valve 17 is opened, and the glass substrates are introduced into the tunnel vacuum calcination furnace 21. The tunnel vacuum calcination furnace 21 realizes the sealing step by dividing the temperature profile shown in FIG. 11 into zones $Z_1$ to $Z_5$ shown in FIG. 10 and by controlling a temperature of a heating line in the tunnel vacuum calcination furnace 21. When the sealing is completed, the glass panel is carried to a panel carry-out chamber 22, and the glass panel can be carried out of the panel sealing device by operating gate valves 18, 19. It is also possible to further shorten the tact time by adopting a process in which the glass panels flow stacked in multiple stages.

Hereinafter, embodiments will be described in detail.

Embodiment 1

In the present embodiment, by using two soda lime glass substrates and a glass frit, the multi-layer glass panel shown in FIGS. 1 and 2 is produced. As the sealing material, low temperature sealing glass paste, which is prepared by mixing and blending particles of the low melting point glass composition, particles of low thermal expansion ceramics, and a solvent, is used.

(Preparation of Glass Composition)

Glass compositions (VTA-1 to 5) having compositions shown in Table 1 to be described below are prepared. Compositions in Table are indicated as molar ratio in terms of oxide of each component. As starting materials, $V_2O_5$ produced by Shinko Chemical Co., Ltd., $Ag_2O$ produced by Wako Pure Chemical Industries, Ltd., and other oxide powders (purity 99.9%) produced by Kojundo Chemical Laboratory Co., Ltd. are used. In some samples, as a Ba source and a P source, $Ba(PO_3)_2$ (barium phosphate produced by Rasa Industries, Ltd.) is used.

Starting material powders are mixed at molar ratios shown in Table and are placed in a platinum crucible. In mixing, the starting material powders are mixed in the platinum crucible using a metal spoon in view of avoiding extra moisture absorption in the starting material powders.

The platinum crucible including the starting material powders therein is placed in a glass melting furnace, and the starting material powders are heated and melted. The temperature is increased at a heating rate of 10° C./min, and is maintained for one hour while stirring the glass which is melt at a set temperature (700-900° C.). Then, the crucible is taken out of the glass melting furnace, and the glass is molded in a graphite mold which has been heated to 150° C. in advance. Next, the molded glass is transferred to a straightening furnace which has been heated to a straightening temperature in advance, and is relieved from strain by maintaining the temperature for one hour, and then is cooled to room temperature at a rate of 1° C./min. By pulverizing the glass which has been cooled to the room temperature, glass composition powders having compositions shown in Table are prepared.

TABLE 1

| Glass No. | Main components (mol %) | | | Sub-components (mol %) | | | |
|---|---|---|---|---|---|---|---|
| | $V_2O_5$ | $TeO_2$ | $Ag_2O$ | BaO | $WO_3$ | $P_2O_5$ | $La_2O_3$ |
| VTA-1 | 17.6 | 37.7 | 30.8 | 4.2 | 4.9 | 5.8 | — |
| VTA-2 | 22.0 | 35.0 | 42.5 | — | — | — | 0.5 |
| VTA-3 | 20.0 | 39.5 | 30.0 | 5.0 | 2.0 | — | 0.5 |
| VTA-4 | 23.0 | 28.0 | 45.0 | 3.0 | 1.0 | — | — |
| VTA-5 | 23.0 | 29.5 | 45.0 | — | 2.0 | — | 0.5 |

(Evaluation of Characteristic Temperatures)

Transition point, yield point, softening point, sintering point, flow point, working point and crystallization onset temperature are measured for the glass composition powders obtained as described above by differential thermal analysis (DTA). In the DTA measurement, a mass of a sample to be measured and a mass of a reference sample (α-alumina) are respectively 650 mg, the temperature is increased at a heating rate of 5° C./min in the atmosphere, and the transition point $T_g$ as the starting point of the first endothermic peak temperature, the yield point $M_g$ as the first endothermic peak temperature, the softening point $T_s$ as the second endothermic peak temperature, the sintering point $T_{sint}$ as the temperature at which the glass becomes the sintered body, the flow point $T_f$ as the temperature at which the glass begins to melt, the working point $T_w$ as the temperature suitable for forming the glass, and the crystallization onset temperature $T_{cry}$ as the onset temperature of exothermic peak due to crystallization, are obtained by the tangent method (see FIG. 4). Results are shown in Table 2.

TABLE 2

| | Characteristic temperatures (° C.) | | | | | | |
|---|---|---|---|---|---|---|---|
| Glass No. | Transition point $T_g$ | Yield point $M_g$ | Softening point $T_s$ | Sintering point $T_{sint}$ | Flow point $T_f$ | Working point $T_w$ | Crystallization onset temperature $T_{cry}$ |
| VTA-1 | 207 | 225 | 263 | 275 | 302 | 312 | — |
| VTA-2 | 152 | 165 | 196 | 206 | 217 | 223 | 233 |
| VTA-3 | 190 | 212 | 245 | 253 | 272 | 278 | — |
| VTA-4 | 147 | 164 | 191 | 200 | — | — | 214 |
| VTA-5 | 151 | 164 | 193 | 203 | 214 | — | 226 |

(Preparation of Low Temperature Sealing Glass Paste)

The glass paste is prepared by mixing and blending the glass composition, the particles of low thermal expansion ceramics, and the solvent. As the glass composition, VTA-3 described in Table 1 is used. The particle size of the glass composition is about 10 μm. As the particles of low thermal expansion ceramics, zirconium phosphate tungstate having a particle size of about 30 μm is used. Further, α-terpineol is used as the solvent, and isobornylcyclohexanol is added as a viscosity modifier. The low temperature sealing glass paste is prepared such that a blending ratio of particles of the lead-free low melting point glass composition VTA-3 and zirconium phosphate tungstate is 50:50 by vol %, and a content rate of solid content (a total of VTA-3 and zirconium phosphate tungstate) is 75-80 mass %. Further, in order to maintain the space between the glass substrates, spherical beads made of soda lime glass having a particle size of about 180-200 μm are contained in the low temperature sealing glass paste. The spherical bead content of the solid content is 1 vol % for the low temperature sealing glass paste and is 20 vol % for the spacer.

(Preparation of Vacuum Insulation Multi-Layer Glass Panel)

In the present embodiment, soda lime glass substrates 1, 2 having a size of 800 nm×1000 mm×3 mmt are used. Note that, each glass substrate is used after removing contaminants such as organic matter by ozone cleaning before the sealing step. As shown in FIG. 6A, the prepared low temperature sealing glass paste is calcined and the spacers 3 are placed on the soda lime glass substrate 1 side. Since the soda lime glass substrates 1 and 2 are easily broken by deformation, a plurality of spacers 3 are two-dimensionally arranged at regular intervals in the space formed by the two glass substrates. The glass paste constituting the sealing portion 4 is used to fix the spacer 3. Further, in order to set a distance between the soda lime substrates 1 and 2, that is, the thickness of the space, to about 200 μm, spherical beads having a diameter a little less than 200 μm are contained in the spacer 3. The stainless steel material is used for the spherical beads. On the soda lime glass substrate 2 side, after a heat ray reflection film 5 is formed, the column members 6 having a thickness larger than that of the sealing portion 4 are arranged around the sealing portion 4.

The glass panel is formed by superimposing the substrates 1, 2 and by fixing them with the clips 7. Then, the glass panel is placed in the vacuum device 9. In the vacuum device, the glass panel is vertically sandwiched and heated by the heaters 8, while it is vacuum evacuated by the vacuum pump 10.

When a pressure inside the vacuum device is equal to or lower than $1\times10^{-3}$ (Pa), the glass panel is heated according to the temperature profile shown in FIG. 7. The temperature is increased to $T_1$ [° C.] at the heating rate $T_3$ [° C./min]. $T_3$ is set to 1-10 [° C./min]. The temperature is maintained at $T_1$ [° C.] for 30-60 min and then is increased to $T_2$ [° C.] at the heating rate $T_3$ [° C./min]. The temperature is maintained at $T_2$ [° C.] for 10-30 min and cooled. The cooling rate $T_4$ [° C./min] is in the range of 1-20 [° C./min]. Here, the temperature $T_1$ [° C.] is 260° C. The temperature $T_2$ [° C.] is near melting point of a vacuum spacer 6.

(Evaluation of Vacuum Insulation Multi-Layer Glass Panel)

Ten sheets of the vacuum insulation multi-layer glass panel prepared in the present embodiment are visually inspected. As a result, crack, chap or the like is not observed and there is no problem in appearance. Further, by the spherical beads in the spacers 3 and in the sealing portion 4, the distance between the soda lime glass substrates 1 and 2 is substantially uniform. In other words, the vacuum insulation multi-layer glass panel having a predetermined space is obtained. Further, it is confirmed by helium leak test that an interior of the glass panel is in a vacuum state and an outer periphery of the glass panel is hermetically sealed.

In order to confirm reliability of the sealing portion 4, three sheets of the vacuum insulation multi-layer glass panel prepared are immersed in warm water at 50° C. for 30 days. It is confirmed that all three glass panels are not invaded by water therein, and the interior of the glass panel is maintained in a vacuum state. Further, for three other sheets of the vacuum insulation multi-layer glass panel, temperature cycle test of −50° C. to +100° C. is performed 1000 times. Even in this test, the interior of all three glass panels is maintained in a vacuum state. From the above, it is understood that the vacuum insulation multi-layer glass panel, which uses low temperature sealing glass frit or the low temperature sealing glass paste of the present invention, has a sealing portion having high reliability and thermal insulation. Further, by using the low temperature sealing glass frit or the low temperature sealing glass paste of the present invention, it is possible to significantly reduce the sealing temperature, thereby greatly improving the productivity of the vacuum insulation multi-layer glass panel.

Embodiment 2

The vacuum insulation multi-layer glass is produced in the same manner as in Embodiment 1 except that the glass composition used for the sealing portion is VTA-2 described in Table 1, and tin (melting point 232° C.) is used as the column member.

As in Embodiment 1, visual inspection, helium leak test, immersion test and temperature cycle test are performed. The same result as in Embodiment 1 is obtained in any of the tests.

Embodiment 3

The vacuum insulation multi-layer glass is produced in the same manner as in Embodiment 2 except that the glass composition used for the sealing portion is VTA-4 described in Table 1.

As in Embodiment 1, visual inspection, helium leak test, immersion test and temperature cycle test are performed. The same result as in Embodiment 1 is obtained in any of the tests.

Embodiment 4

The vacuum insulation multi-layer glass is produced in the same manner as in Embodiment 2 except that the glass composition used for the sealing portion is VTA-5 described in Table 1.

As in Embodiment 1, visual inspection, helium leak test, immersion test and temperature cycle test are performed. The same result as in Embodiment 1 is obtained in any of the tests.

Embodiment 5

The vacuum insulation multi-layer glass is produced in the same manner as in Embodiment 1 except that the glass composition used for the sealing portion is VTA-1 described in Table 1, and gold-tin solder (melting point 280° C.) is used as the column member.

As in Embodiment 1, visual inspection, helium leak test, immersion test and temperature cycle test are performed. The same result as in Embodiment 1 is obtained in any of the tests.

Embodiment 6

The vacuum insulation multi-layer glass is produced in the same manner as in Embodiment 1 except that the arrangement of the column members is changed. In the present embodiment, the vacuum spacers 6 are arranged inside the sealing portion 4. FIGS. 6A, 6B and 6C show configuration views of the present embodiment. By arranging the vacuum spacers 6 inside the sealing portion 4, the sealing portion 4 is spread to a periphery of the soda lime glass substrates 1, 2, and thus it is possible to increase an effective area of the multi-layer glass.

REFERENCE SIGNS LIST

1: first glass substrate
2: second glass substrate
3: spacer
4: sealing portion
5: heat ray reflection film
6: column member
7: clip
8: heater
9: vacuum device
10: pump
11: physical adsorption component
12: chemical adsorption component
13: low melting point glass reduction component
14: vacuum layer
15: vacuum layer
16 to 19: gate valve
20: panel carry-in chamber
21: tunnel vacuum calcination furnace
22: panel carry-out chamber

The invention claimed is:

1. A multi-layer glass comprising:
a first glass substrate;
a second glass substrate disposed facing the first glass substrate with a space therebetween;
a sealing portion, which contains a glass composition and is disposed in a peripheral edge portion of the space between the first glass substrate and the second glass substrate; and
column members disposed between the first glass substrate and the second glass substrate,
wherein the column member is made of a metal or a metal alloy, and
wherein a melting point of the metal or the metal alloy is higher than a softening point of the glass composition and is lower than or equal to a temperature 20° C. higher than a flow point of the glass composition.

2. The multi-layer glass according to claim 1, wherein the melting point of the metal or the metal alloy is lower than or equal to the flow point of the glass composition.

3. The multi-layer glass according to claim 1, wherein the melting point of the metal or the metal alloy is lower than 320° C.

4. The multi-layer glass according to claim 1, wherein the metal or the metal alloy constituting the column member is one of Bi, Sn, gold-tin alloy, zinc-tin alloy and Sn—Ag eutectic solder.

5. The multi-layer glass according to claim 1, wherein the glass composition is a low melting point glass.

6. The multi-layer glass according to claim 1, wherein the softening point of the glass composition is lower than or equal to 280° C.

7. The multi-layer glass according to claim 1, wherein the glass composition contains V2O5.

8. The multi-layer glass according to claim 7, wherein the glass composition contains $V_2O_5$, $TeO_2$ and $Ag_2O$.

9. The multi-layer glass according to claim 1, wherein the multi-layer glass comprises spacers for ensuring the space between the first glass substrate and the second glass substrate.

10. The multi-layer glass according to claim 1, wherein the column members are provided outside the sealing portion.

11. A method for producing the multi-layer glass according to claim 1, comprising:
a step of applying a sealing material containing a glass composition to a first glass substrate and then calcining the first glass substrate to form a sealing portion;
a step of arranging column members, which are higher than the sealing portion and are made of a metal or alloy having a melting point, that is higher than a softening point of the glass composition and is lower than or equal to a temperature 20° C. higher than a flow point of the glass composition, on a second glass substrate;
a step of superimposing the first glass substrate and the second glass substrate and then pressurizing and fixing the glass substrates; and
a vacuum sealing step of evacuating the first glass substrate and the second glass substrate, which are fixed in a vacuum device, while heating them to a temperature, that is higher than the softening point of the glass composition and is lower than or equal to a temperature 20° C. higher than the flow point of the glass composition.

12. The method for producing the multi-layer glass, according to claim 11,
wherein in the vacuum sealing step, the first glass substrate and the second glass substrate are heated to a first temperature and maintained at the first temperature, and then heated to a second temperature and maintained at the second temperature, to be vacuum sealed, wherein the first temperature is higher than or equal to the softening point of the glass composition and is lower than the melting point of the metal or alloy, and wherein the second temperature is higher than or equal to the melting point of the metal or alloy and is lower than or equal to the temperature 20° C. higher than the flow point of the glass composition.

13. The method for producing the multi-layer glass, according to claim 11, wherein a vacuum sealing device having a multi-stage panel installation equipment is used.

14. The method for producing the multi-layer glass, according to claim 11, wherein a vacuum sealing device having a panel carry-in chamber, a tunnel vacuum calcination furnace and a panel carry-out chamber is used.

* * * * *